United States Patent Office.

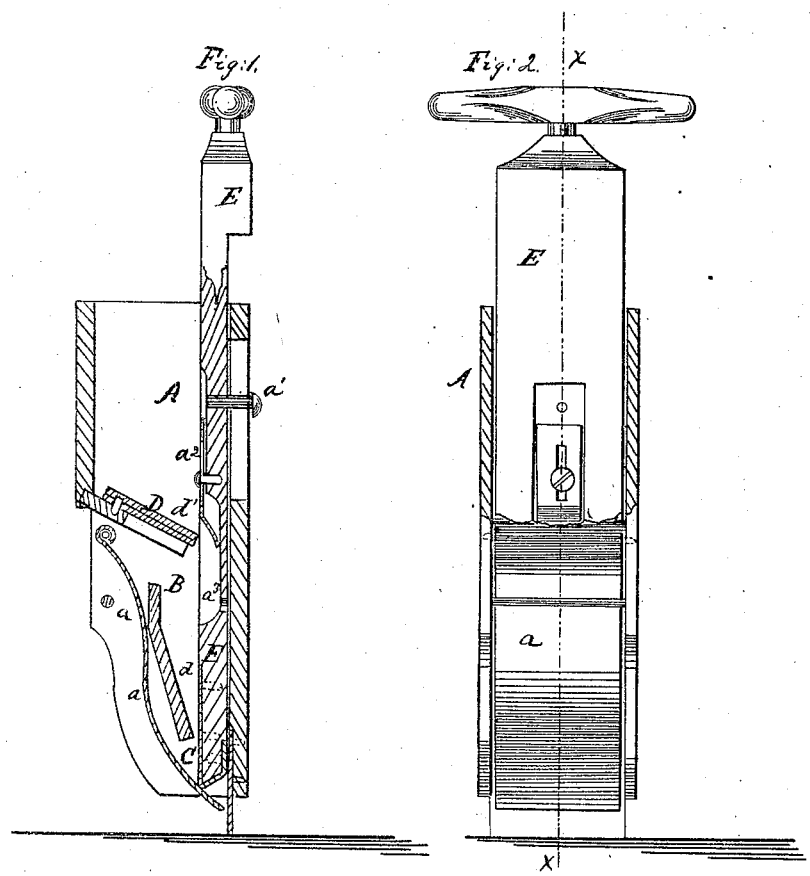

WILLIAM DAGGETT, 4TH, OF CORDOVA, ILLINOIS.

Letters Patent No. 75,380, dated March 10, 1868.

---

IMPROVEMENT IN CORN-PLANTERS.

---

The Schedule referred to in these Letters Patent and making part of the same.

---

TO ALL WHOM IT MAY CONCERN:

Be it known that I, WILLIAM DAGGETT, 4th, of Cordova, in the county of Rock Island, and State of Illinois, have invented new and improved Corn-Planters; and I do hereby declare that the following is a full, clear, and exact description thereof, which will enable others skilled in the art to make and use the same, reference being had to the accompanying drawings, forming part of this specification.

This invention relates to a new and improved method of constructing corn-planters, to be operated by the hand, whereby corn is more rapidly and economically planted.

It consists of a planter composed of three chambers, through which slides a plunger, provided with a valve, by means of which the required quantity of corn is carried from one chamber to another, and finally to the ground.

It consists also in the bottom of the under chamber being formed of steel or other elastic substance, which closes the outlet of the same until the plunger in the downward movement of the same forces the corn upon the said springing bottom through the outlet into the ground, whereby the required quantity of corn for a single hill is always in readiness to be forced into the ground at the next downward movement of the plunger. In the accompanying plate of drawings—

Figure 1 represents a central vertical section of my invention, taken in the line $x\ x$, fig. 2.

Figure 2 is a back view of the same, portions of the case being removed to show the inside.

Similar letters of reference indicate corresponding parts.

A is the upper chamber; B is the middle chamber; C is the lower chamber; $a$ is the spring-bottom of the same; D is the upper partition; $d$ is the middle partition; $d'$ is a cleaner or striker to strike the corn from the cavity $a^3$. E is the plunger; $a^3$ is the cavity in the same. $a^1$ is a pin, by means of which the plunger is kept upon the side of the planter. $a^2$ is a gauge to diminish or increase the size of the cavity $a^3$.

The corn-planter is made of wood, of the same general form and size as corn-planters now commonly in use, and is divided into three chambers, A, B, and C, by the partitions D and $d$. The larger and upper chamber, A, is the receptacle for the corn to be planted, and may be of any convenient size. The partition D is inclined towards one side, and is made of wood or other suitable material, so as to extend nearly across the corn-planter, as shown in the drawing, so as to leave sufficient room between the edge of the same and the plunger E, also as shown, and is covered upon the upper side with felt or other soft material, which extends entirely to the plunger E, so as to form a striker to strike the corn from the plunger E.

The partition $d$ is attached to the sides, and extends inclining downwards, so as nearly to touch the plunger E, and so as to form a second chamber, B, to receive the corn from the cavity $a^3$ in the plunger E, and yet not permit the same to drop into the chamber C until the plunger E is drawn up above the bottom of said partition $d$. The chamber C is formed by the partition $d$ above described, and by a metallic spring-bottom, $a$, which, being secured at the back of the planter, curves downwards and forwards, so as to extend beyond the plunger E, and so as that when the plunger is drawn up to entirely cover the outlet of the planter, the sides or edges of the spring-bottom $a$ being left free, so as that when the plunger E is forced down, the spring-bottom will be forced backwards so as to allow the plunger E to pass through into the ground, the corn received from the chamber B being held upon the spring-bottom $a$, under the plunger E, when the same is drawn up.

Upon the front side of the planter, and within the same, and secured to the side, and moving upon a pin, $a^1$, is a plunger, E. The plunger E is made of wood or other suitable material, and is rectangular in form, of a width equal to the width of the planter on the inside, and of greater length than said planter, as shown in the drawing, provided upon the upper end with any convenient handle, by means of which the same is operated by the hand. A little below the centre of the said plunger E, and opening, when said plunger is up, into the chamber A, is a cavity to receive the corn from said chamber A, said cavity being provided with a gauge, $a^2$, by means of which the size of the same is increased or diminished, according to the quantity of corn to be deposited at one time in the ground. Said plunger is covered upon the lower end with a metallic lining, to protect the same from wear.

The operation is such that by raising the plunger E, the chamber A being filled with corn, the corn in said chamber A fills the cavity $a^3$, the plunger is then forced down, when the corn in the cavity $a^3$ passes into the chamber B, and from thence, when the plunger is raised, into the chamber C, upon the spring-bottom $a$, under the lower end of the plunger E, by which, in the next downward movement of the plunger E, the corn is forced into the ground and covered by the returning of the spring-bottom $a$, the operation being repeated as often as may be required.

Constructed as above described, it constitutes a convenient and reliable corn-planter, the advantage of which is that corn is planted more rapidly and economically.

I claim as new, and desire to secure by Letters Patent—

1. The gauge $a^2$ for regulating the size of the cavity $a^3$ in the plunger E of a hand corn-planter, substantially as described.

2. I claim the corn-planter constructed as described, and consisting of the box A, having partitions D $d$, spring-plate $a$, scraper $d'$, plunger E, having cavity $a^3$, gauge $a^2$, and pin $a^1$, all constructed, arranged, and operating as set forth.

WILLIAM DAGGETT, 4TH.

Witnesses:
R. M. GRENELL,
WM. C. MERRY.